(12) United States Patent
Noureddine

(10) Patent No.: US 10,556,272 B2
(45) Date of Patent: Feb. 11, 2020

(54) HOLDER FOR A TOOL FOR MATERIAL-REMOVING MACHINING, IN PARTICULAR FOR A LONGITUDINAL TURNING TOOL

(71) Applicant: Hartmetall-Werkzeugfabrik Paul Horn GmbH, Tuebingen (DE)

(72) Inventor: Hassan Noureddine, Nehren (DE)

(73) Assignee: Hartmetall-Werkzeugfabrik Paul Horn GmbH, Tuebingen (DE)

( * ) Notice: Subject to any disclaimer, the term of this patent is extended or adjusted under 35 U.S.C. 154(b) by 0 days.

(21) Appl. No.: 16/195,215

(22) Filed: Nov. 19, 2018

(65) Prior Publication Data
US 2019/0084051 A1 Mar. 21, 2019

Related U.S. Application Data

(63) Continuation of application No. PCT/EP2017/061942, filed on May 18, 2017.

(30) Foreign Application Priority Data

May 20, 2016 (DE) .................... 10 2016 109 327

(51) Int. Cl.
*B23B 27/10* (2006.01)
*B23B 29/04* (2006.01)
*B23B 27/04* (2006.01)

(52) U.S. Cl.
CPC ............ *B23B 27/04* (2013.01); *B23B 29/043* (2013.01); *B23B 27/10* (2013.01); *B23B 2205/02* (2013.01); *B23B 2205/04* (2013.01)

(58) Field of Classification Search
CPC . B23B 2205/02; B23B 2205/04; B23B 27/04; B23B 29/043; B23B 27/10; B23B 2250/12
See application file for complete search history.

(56) References Cited

U.S. PATENT DOCUMENTS 4,357,123 A * 11/1982 Zweekly ............... B23B 27/045
407/110
4,780,029 A * 10/1988 Beck ...................... B23B 29/04
407/77

(Continued)

FOREIGN PATENT DOCUMENTS

CN 1166148 11/1997
CN 1382552 12/2002

(Continued)

OTHER PUBLICATIONS

International Preliminary Report on Patentability for International Application No. PCT/EP2017/061942, dated Nov. 29, 2018.

(Continued)

*Primary Examiner* — Sara Addisu
(74) *Attorney, Agent, or Firm* — Jason H. Vick; Sheridan Ross, PC

(57) ABSTRACT

A holder for a tool for machining a workpiece, wherein the holder comprises a cutting insert receptacle in the region of its front end for receiving a cutting insert and a clamping portion in the region of its opposite rear end for clamping the holder in a machine tool. The cutting insert receptacle comprises an upper and a lower clamping jaw, wherein the holder comprises an upper part on which the upper clamping jaw is arranged, and a lower part on which the lower clamping jaw is arranged. The upper and the lower parts are connected together exclusively by means of a web which extends between a first and a second separating slit, wherein the two separating slits extend between the upper part and the lower part of the holder and are arranged on opposite sides of the web such that the upper part is pivotable relative to the lower part via the web in the manner of a rocker. The first separating slit extends in a front holder region between the cutting insert receptacle and the web. The second separating slit extends in a central holder region between the web (Continued)

and the clamping portion. The holder further comprises an actuating means which cooperates with the upper part in the central holder region and is configured to spread the second separating slit in order to move the upper clamping jaw toward the lower clamping jaw and to clamp the cutting insert between the upper and the lower clamping jaws.

15 Claims, 4 Drawing Sheets

(56) References Cited

U.S. PATENT DOCUMENTS

| | | | |
|---|---|---|---|
| 4,887,945 A | 12/1989 | Pano | |
| 5,035,545 A * | 7/1991 | Zinner | B23B 27/04 407/110 |
| 5,207,537 A * | 5/1993 | Englund | B23B 29/043 407/110 |
| 5,267,817 A | 12/1993 | Englund | |
| 5,516,241 A | 5/1996 | Plutschuck et al. | |
| 5,795,109 A | 8/1998 | Jonsson et al. | |
| 5,888,028 A | 3/1999 | Grainger et al. | |
| 6,139,227 A * | 10/2000 | Schafer | B23B 27/04 407/109 |
| 6,186,704 B1 * | 2/2001 | Hale | B23B 27/04 407/101 |
| 6,814,526 B2 | 11/2004 | Shiraiwa et al. | |
| 8,491,232 B2 | 7/2013 | Schaefer | |
| 8,701,537 B2 * | 4/2014 | Baernthaler | B23B 27/045 83/839 |
| 8,747,032 B2 | 6/2014 | Oettle et al. | |
| 8,827,598 B2 | 9/2014 | Henry et al. | |
| 9,555,477 B2 | 1/2017 | Tsuda | |
| 9,656,326 B2 | 5/2017 | Sadikov | |
| 2004/0151551 A1 * | 8/2004 | Oettle | B23B 29/043 407/117 |
| 2008/0124180 A1 * | 5/2008 | Breisch | B23B 27/10 407/110 |
| 2008/0131215 A1 * | 6/2008 | Sjoo | B23B 27/04 407/110 |
| 2012/0230780 A1 * | 9/2012 | Henry | B23B 27/10 407/11 |
| 2013/0129428 A1 * | 5/2013 | Henry | B23B 27/04 407/11 |
| 2014/0099168 A1 * | 4/2014 | Schaefer | B23B 27/10 407/11 |
| 2014/0133924 A1 * | 5/2014 | Oren | B23B 29/043 407/11 |
| 2014/0234040 A1 * | 8/2014 | Hecht | B23B 27/04 407/107 |
| 2015/0086282 A1 * | 3/2015 | Zeeb | B23B 27/04 407/34 |
| 2016/0136733 A1 | 5/2016 | Kaufmann et al. | |
| 2019/0047057 A1 * | 2/2019 | Breisch | B23B 29/043 |
| 2019/0210115 A1 * | 7/2019 | Jansson | B23B 27/04 |

FOREIGN PATENT DOCUMENTS

| | | | |
|---|---|---|---|
| CN | 2892333 Y | 4/2007 | |
| CN | 202169380 U | 3/2012 | |
| CN | 104080563 A | 10/2014 | |
| CN | 105121077 A | 12/2015 | |
| DE | 3301919 A1 | 7/1984 | |
| DE | 3635193 A1 | 3/1988 | |
| DE | 3942585 A1 | 7/1990 | |
| DE | 69130427 T2 | 3/1999 | |
| DE | 19807498 A1 | 9/1999 | |
| DE | 60003588 T2 | 12/2003 | |
| DE | 102012019450 A1 | 5/2013 | |
| EP | 0259846 A1 | 3/1988 | |
| EP | 0611622 B1 | 10/1998 | |
| EP | 0937526 A1 | 8/1999 | |
| EP | 1025939 B1 | 7/2003 | |
| EP | 1524053 A2 * | 4/2005 | B23B 29/046 |
| EP | 1533056 A1 * | 5/2005 | B23B 27/04 |
| EP | 2282859 B1 | 1/2013 | |
| EP | 2379260 B1 | 3/2015 | |
| GB | 2082485 | 3/1982 | |
| JP | 2017136670 A * | 8/2017 | B23B 27/04 |
| SU | 1187925 A1 | 10/1985 | |
| SU | 1463397 A1 | 3/1989 | |
| SU | 1757773 A1 | 8/1992 | |
| WO | WO 2009/135592 | 11/2009 | |
| WO | WO 2014/174507 | 10/2014 | |

OTHER PUBLICATIONS

International Search Report for International Application No. PCT/EP2017/061942, dated Jul. 27, 2017.

Written Opinion for International Application No. PCT/EP2017/061942, dated Jul. 27, 2017.

Office Action for corresponding Chinese Patent Application No. 201780034271.0, dated Nov. 5, 2019.

* cited by examiner

HOLDER FOR A TOOL FOR MATERIAL-REMOVING MACHINING, IN PARTICULAR FOR A LONGITUDINAL TURNING TOOL

CROSS REFERENCE TO RELATED APPLICATIONS

This application is a continuation of international patent application PCT/EP2017/061942, filed on May 18, 2017 designating the U.S., which international patent application has been published in German language and claims priority from German patent application DE 10 2016 109 327.0, filed on May 20, 2016. The entire contents of these priority applications are incorporated herein by reference.

BACKGROUND OF THE INVENTION

This disclosure relates to a holder for a tool for machining a workpiece. This disclosure further relates to a tool having such a holder and a cutting insert which is exchangeably fixable thereon. The tool according to the present disclosure relates in particular to a turning tool, preferably to a so-called longitudinal turning tool.

An exemplary tool holder for a turning tool is known from EP 2 282 859 B1.

Turning tools of this type mostly consist of a substantially bar-shaped holder produced from steel and a cutting insert made of hard metal fastened thereon so as to be interchangeable. In the majority of cases, the cutting insert is fastened on the holder by means of a screw or another fastening means. The cutting insert, which, as a wear part, has to be changed relatively frequently, is consequently able to be released in a relatively simple manner from the holder and exchanged for a new one.

When turning rotationally symmetrical components, machining often has to take place very close to the spindle. This is the case especially with so-called longitudinal turning lathes as the feed movement here proceeds from the spindle. For this reason, the tools (so-called longitudinal turning tools) are mostly arranged directly on the spindle in said lathes. In the majority of cases multiple such tools of various types are arranged on the spindle at the same time in order to be able to change from one tool to the next in a variable manner depending on the desired turning. For reasons of space, the tools in longitudinal turning lathes are often clamped in so-called linear units in which multiple tools or tool holders are arranged directly one above another. When said tool holders are occupied with exchangeable cutting inserts, the cutting insert change is frequently difficult as, in the vast majority of cases, access to the fastening means to be released (mainly screws) is very limited. Consequently, the tool holder as a whole frequently has to be removed from the linear unit in order to be able to change the cutting insert. This is laborious and results in overly long setup times.

EP 2 282 859 B1 discloses various solutions where the screw serving as fastening means is insertable in the holder of the tool from a great many sides so that, depending on the installation situation, a corresponding solution with a favorable screw position is able to be chosen.

EP 2 379 260 B1 further discloses a tool where the clamping screw used for fastening the cutting insert is able to be inserted into the holder from two different sides so that, depending on the installation situation, the clamping screw is fastened in the holder either from the one or from the other side.

SUMMARY OF THE INVENTION

It is an object to provide a holder for a tool of the above-mentioned type where it is possible to be able to fasten the cutting insert on the holder in as simple a manner as possible even in tight installation situations. In particular, the structural design for tightening and releasing the cutting insert shall be designed in an alternative manner compared to the aforementioned solutions of the prior art.

According to a first aspect, a holder for a tool for machining a workpiece is presented, wherein the holder comprises at a front end a cutting insert receptacle for receiving a cutting insert and comprises at a rear end opposite the front end a shank which extends along a longitudinal axis and forms a clamping portion for clamping the holder in a machine tool, wherein the cutting insert receptacle comprises an upper and a lower clamping jaw, wherein the holder comprises an upper part on which the upper clamping jaw is arranged and comprises a lower part which is integrally connected to the shank and on which the lower clamping jaw is arranged, wherein the upper and the lower parts are connected together exclusively by means of a web which extends between a first and a second separating slit, wherein the two separating slits extend between the upper part and the lower part of the holder and are arranged on opposite sides of the web such that the upper part is pivotable relative to the lower part via the web in the manner of a rocker, wherein the first separating slit extends in a front holder region between the cutting insert receptacle and the web, and wherein the second separating slit extends in a central holder region between the web and the clamping portion, wherein the holder further comprises a screw which engages in a thread which is provided in the lower part and extends along a thread axis which is aligned perpendicularly to the longitudinal axis of the holder, wherein the screw comprises a conical screw head which cooperates with the upper part in the central holder region and is configured to spread the second separating slit in order to move the upper clamping jaw toward the lower clamping jaw and to clamp the cutting insert between the upper and the lower clamping jaws.

According to a second aspect, a tool for machining a workpiece is presented, having a cutting insert and a holder, wherein the holder comprises at a front end a cutting insert receptacle for receiving the cutting insert and comprises at a rear end opposite the front end a shank which extends along a longitudinal axis and forms a clamping portion for clamping the holder in a machine tool, wherein the cutting insert receptacle comprises an upper and a lower clamping jaw, wherein the holder comprises an upper part on which the upper clamping jaw is arranged and comprises a lower part which is integrally connected to the shank and on which the lower clamping jaw is arranged, wherein the upper and the lower parts are connected together exclusively by means of a web which extends between a first and a second separating slit, wherein the two separating slits extend between the upper part and the lower part of the holder and are arranged on opposite sides of the web such that the upper part is pivotable relative to the lower part via the web in the manner of a rocker, wherein the first separating slit extends in a front holder region between the cutting insert receptacle and the web, and wherein the second separating slit extends in a central holder region between the web and the clamping portion, wherein the holder further comprises a screw which engages in a thread which is provided in the lower part and extends along a thread axis which is aligned perpendicularly to the longitudinal axis of the holder, wherein the screw comprises a conical screw head which cooperates with the upper part in the central holder region and is configured to spread the second separating slit in order to move the upper clamping jaw toward the lower clamping jaw and to clamp the cutting insert between the upper and the lower clamping jaws.

The herein presented holder is preferably designed in such a manner that just one single mechanical connection, namely by means of the mentioned web, exists between the upper part, on which the upper clamping jaw is arranged, and the lower part on which the lower clamping jaw is arranged. This results in a type of rocker, the connecting web between the upper and lower parts acting as a joint of said rocker. It is obvious, however, that this is not an actual joint or bearing but a stable mechanical connection between the upper and lower parts which, on account of the small width, enables the upper part to be elastically pivotable at least in part. To ensure said pivotability, separating slits, which separate the upper part from the lower part, are connected on both sides of the web. Said separating slits therefore generate a type of space between the upper and the lower parts on both sides of the web, which space does not have to be filled and in which air may be present.

The screw cooperates with the upper part in order to press said upper part upward in its rear region, which is arranged above the second separating slit. As a result of the rocker mechanism of the upper part, the movement upward of the rear part of the upper part, as a result of which the second separating slit is spread apart, brings about a movement of the upper clamping jaw toward the lower clamping jaw. The height of the cutting insert receptacle is consequently reduced so that the cutting insert is clamped in said cutting insert receptacle.

Releasing the actuating element brings about the reverse movement, namely the upper part pivoting back, where the upper clamping jaw is moved away from the lower clamping jaw and the cutting insert receptacle is spread. The cutting insert can then be removed preferably by hand.

The thread axis preferably extends parallel to the first and/or second separating slit, the separating slits preferably extending over the entire width of the holder and consequently forming a type of plane between the upper and lower parts. In other words, the thread axis preferably extends parallel to the web which extends from a first longitudinal side of the holder to an oppositely arranged second longitudinal side of the holder.

The screw used as actuating means is preferably screwed into the holder at the side. This provides the advantage of it being very simple to access, in particular in automatic longitudinal turning lathes, in contrast to screws which are screwed in frontally or at angle from the front on the end face of the holder.

The screw comprises a conical screw head which cooperates with the upper part for spreading the second separating slit. Preferably, the conically shaped circumferential surface of the screw head cooperates with the upper part of the holder in order to spread the second separating slit.

When the screw is screwed in the rear part, which is arranged above the second separating slit, the upper part of the holder is automatically moved upward on account of the conical screw head, as a result of which the second separating slit is spread apart. The spreading of the second separating slit, as already mentioned above, causes the first separating slit and the cutting insert receptacle connected to said first separating slit to be reduced in size or compressed on the other side of the web on account of the rocker mechanism. The further the screw is screwed into the holder, the more the upper clamping jaw is moved toward the lower clamping jaw and the cutting insert is clamped between the two clamping jaws.

According to a refinement, the holder comprises a first recess on a first longitudinal side for receiving the screw head, wherein the thread and the second separating slit open out into the first recess and wherein the first recess is delimited at least in part by a contact surface which is arranged on the upper part and cooperates with the screw head. Said contact surface on the upper part of the holder is preferably also shaped conically, similarly to the screw head.

In the last-mentioned refinement, it is particularly preferred for the conically shaped contact surface, which is provided on the upper part of the holder, to enclose with the thread axis a first angle, which is smaller than or equal to a second angle which the conical circumferential surface of the screw head encloses with the longitudinal axis of the screw. In a particularly preferred manner, the two named angles are the same size.

In addition, it is preferred in the last-mentioned refinement that the first recess is delimited at least in part by a lower delimiting surface which is arranged on the lower part, wherein a first distance between the thread axis and the conically shaped contact surface, which is arranged on the upper part, is smaller than a second distance between the thread axis and the lower delimiting surface, and wherein half a diameter of the screw head is smaller than the second distance but is the same size as or greater than the first distance.

The advantage of the above-mentioned dimensioning is that the lower delimiting surface of the first recess runs freely when the screw is tightened so that the screw head of the screw cooperates simply with the conically shaped contact surface, which is arranged on the upper part of the holder, however does not contact the lower delimiting surface of the recess.

According to a refinement, the upper clamping jaw and the lower clamping jaw adjoin a second longitudinal side of the holder which is arranged opposite the first longitudinal side, on which the first recess is arranged.

The screw is therefore preferably screwed into the holder from the side which is arranged opposite the cutting insert receptacle, that is to say the upper and lower clamping jaws. Said type of arrangement improves the mechanical stability of the insert seat or the clamping of the cutting insert in the holder.

According to a further refinement, the holder comprises a second recess on the second longitudinal side for receiving the screw head, wherein the thread and the second separating slit open out into the second recess such that the screw is insertable into the thread as an option both from the first longitudinal side or the first recess and from the second longitudinal side or the second recess.

The equivalent two recesses, which are arranged on opposite sides of the holder, make it possible, depending on the requirement and on the installation situation of the tool in the machine tool, to screw the screw in the holder both from the one and from the opposite other side in order to fasten the cutting insert on the holder.

According to a further refinement, the second separating slit comprises two part portions. A first portion of the second separating slit adjoins the web. A second portion of the second separating slit adjoins a free end of the second separating slit. The first and the second portions are preferably angled relative to one another at an acute angle.

On account of said acute angle, part of the holder shank protrudes beyond the rear part of the upper part. The second portion of the second separating slit extends between said protrusion of the holder shank and the rear part of the holder upper part. The advantage of this is that the rocker mechanism is prevented from being over rotated or over-tilted as the upper part knocks against the protrusion of the holder shank if the first portion of the second separating slit is spread too strongly and the holder upper part is prevented from tilting further.

The first separating slit preferably opens out into the cutting insert receptacle between the upper and the lower clamping jaws. In contrast to the upper and lower clamping jaws, which adjoin the second longitudinal side of the holder and are only arranged on said side of the holder, the first separating slit (and also the second separating slit) extends over the entire width of the holder.

According to a further refinement, the holder comprises an internal coolant channel, wherein a coolant output of the coolant channel is arranged on the upper clamping jaw, and wherein a section of the coolant channel leads from the lower part into the upper part of the holder in the interior of the web.

In this way, coolant can be guided directly to the cutting insert or to the blade thereof in spite of the fact that the holder upper part and the holder lower part are only connected together by means of the web. As the web preferably extends over the entire width of the holder, the web does not experience any excessive mechanical weakening as a result of the integration of the section of the coolant channel.

It is obvious that the features mentioned beforehand and the features yet to be explained below may be used not only in the combination specified in each case but also in other combinations or standing alone without departing from the spirit and scope of the present disclosure.

DESCRIPTION OF PREFERRED EMBODIMENTS

Figure 1:
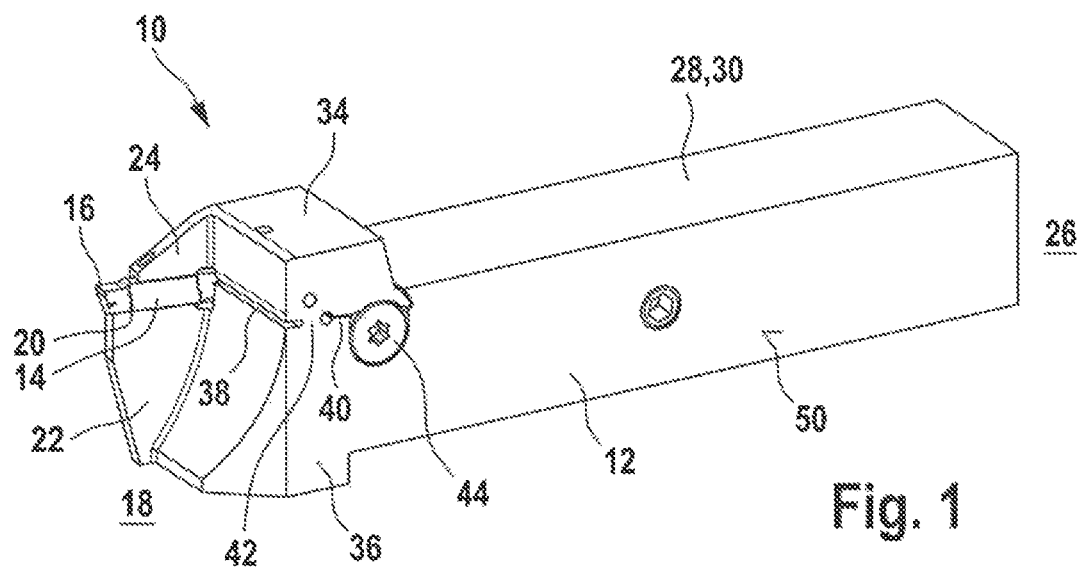
FIG. 1 shows a perspective view of an exemplary embodiment of the tool.
Figure 2:
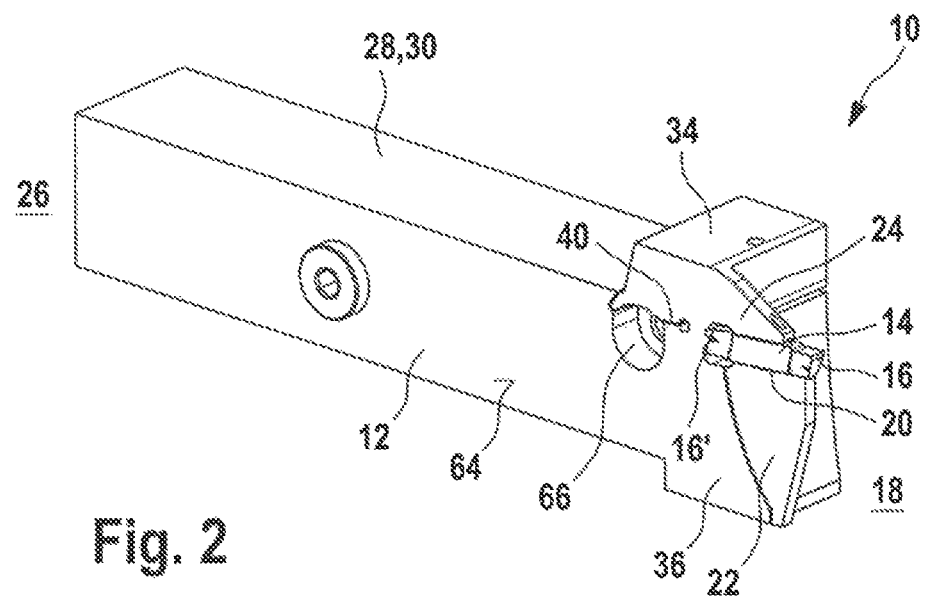
FIG. 2 shows a perspective view of the exemplary embodiment, shown in FIG. 1, when seen from the opposite side.

FIGS. 1 and 2 show perspective views of an exemplary embodiment of the tool from different sides. The tool is designated therein as a whole by way of the reference numeral 10.

The tool 10 comprises a holder 12, which is frequently also designated as tool holder 12, as well as a cutting insert 14. The cutting insert 14 is releasably fastened on the holder 12, that is to say is not a fixed component part of the holder 12. The holder 12 is preferably produced from steel. The cutting insert 14, in contrast, is preferably produced from hard metal. The cutting insert 14 is preferably a so-called indexable cutting insert which comprises two identical cutting heads 16 or 16' according to the exemplary embodiment shown in FIGS. 1 and 2, each of the two cutting heads comprising one or multiple cutting edges, by way of which the workpiece is machined so as to remove material when the tool 10 is used. It is obvious, however, that cutting inserts with only one cutting head 16 or with more than two cutting heads 16 or 16' can also be used in the tool 10.

In the region of its front end 18, the tool holder 12 comprises a cutting insert receptacle 20 which serves as receptacle for the cutting insert 14. The cutting insert receptacle 20 is formed by a lower clamping jaw 22 and an upper clamping jaw 24. The cutting insert 14 is clamped between the lower clamping jaw 22 and the upper clamping jaw 24. The upper clamping jaw 24 is a pivotable clamping jaw, whereas the lower clamping jaw 22 is a rigid clamping jaw.

In the region of its rear end 26, the holder 12 comprises a substantially bar-shaped shank 28. Said shank 28 forms the clamping portion 30 by way of which the holder 12 is able to be clamped in a machine tool. The shank 28 extends substantially along a longitudinal axis 32 (see for example FIG. 6) and preferably has a rectangular cross section.

Figure 3:
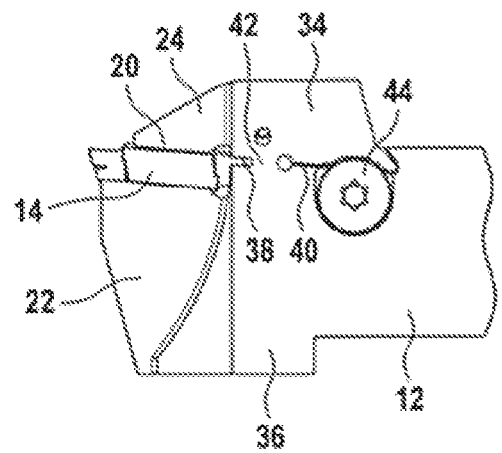
FIG. 3 shows a side view of a detail of the tool.
Figure 4:
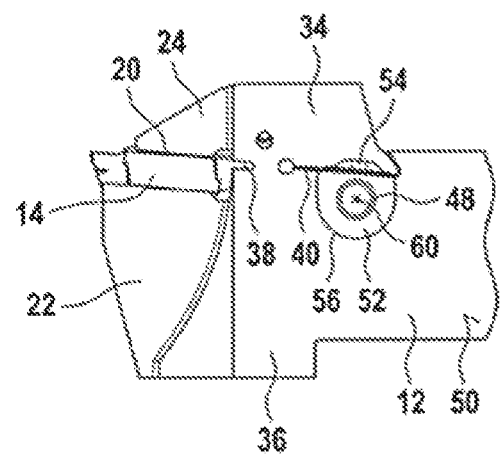
FIG. 4 shows a side view of the detail shown in FIG. 3, an actuating element having been omitted compared to FIG. 3.
Figure 5:
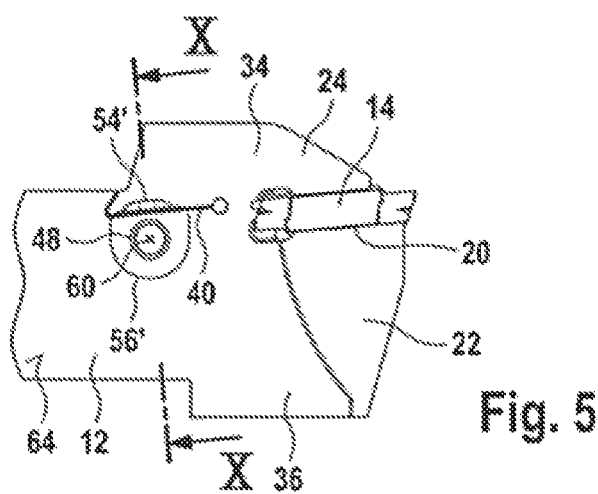
FIG. 5 shows a side view of the detail shown in FIGS. 3 and 4 when seen from the opposite side.

The type of fastening of the cutting insert 14 in the holder 12 is characteristic of the tool 10. The holder 12 is divided for this purpose into an upper part 34 and a lower part 36. The upper clamping jaw 24 is arranged on the upper part 34. The upper part 34 and the lower part 36 are separated from one another by two separating slits 38, 40 (see FIGS. 3-5 in particular). The two separating slits 38, 40 therefore extend when seen spatially between the upper part 34 and the lower part 36 of the holder 12. The first separating slit 38 preferably opens out into the cutting insert receptacle 20, the second separating slit 40 is arranged in a central region of the holder 12 which is arranged closer to the clamping portion 30 or closer to the rear end 26 of the holder 12 compared to the first separating slit 38. The second separating slit 40 preferably extends over the entire width of the holder 12.

A web 42 is arranged between the two separating slits 38, 40. Said web 42 also preferably extends over the entire width of the holder 12. The web 42 serves as a connecting web between the upper part 34 and the lower part 36 of the holder 12. The upper part 34 and the lower part 36, more precisely, are connected together exclusively by means of said web 42. No other direct connection exists between the upper part 34 and the lower part 36. A type of rocker mechanism of the upper parts 34 is generated in this way as the upper part 34 is pivotable relative to the lower part 36 in the manner of a rocker. The web 42, in this case, serves as a type of joint or hinge. However, it is obvious that the pivotability of the upper part 34 is comparatively small on account of the fact that the holder 12 is produced from steel.

Figure 9:
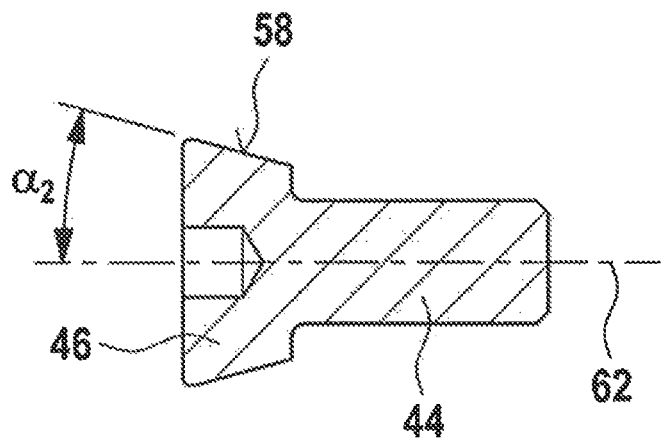
FIG. 9 shows a longitudinal section of an actuating element, used in the tool, according to an exemplary embodiment.

In order to actuate the above-mentioned rocker mechanism of the upper part 34, the holder 12 further comprises an actuating element 44. Said actuating element 44 is preferably a screw with a conically shaped screw head 46 (see FIG. 9). The screw 44 engages in a thread 48 which extends orthogonally to the longitudinal axis 32 in the transverse direction of the holder. The thread 48 is preferably aligned parallel to the first and/or second separating slit 38, 40. The thread 48 is arranged in the rigid lower part 36 of the holder 12. However, in the screwed-in state, the screw 44 cooperates by way of the screw head 46 with the upper part 34 of the holder 12. On account of the conical form of the screw head 46, the rear or holder-side end of the upper part 34 is pressed upward as the screw 44 is screwed deeper and deeper, as a result of which the second separating slit 40 is gradually spread further and further apart. On account of the connection, already ascribed above, between the upper part 34 and the lower part 36 by means of the web 42, the front or workpiece-side end of the upper part 34, in this case, is pivoted downward or toward the lower part 36. The upper clamping jaw 24 is therefore gradually pivoted further and further toward the lower clamping jaw 22 as the screw 44 is screwed deeper and deeper so that the height of the cutting insert receptacle 20 is reduced and the cutting insert 14 is clamped between the upper and the lower clamping jaws 24, 22.

Figure 10:
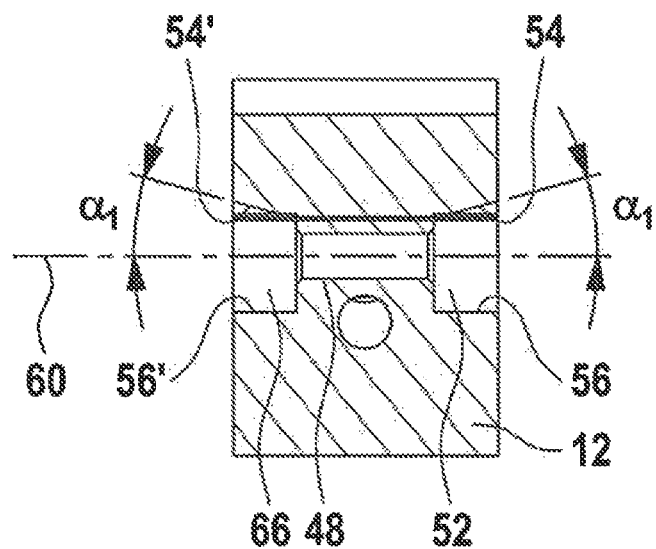
FIG. 10 shows a further cross sectional view of the holder of the tool.

When viewed relatively to the cutting insert receptacle 20, the screw 44 is preferably screwed into the holder 12 from the opposite holder side (see FIGS. 1 and 2). To this end, a first recess 52, which serves for receiving the screw head 46 of the screw 44 (see FIG. 4), is provided on a first longitudinal side 50 of the holder 12. The first recess 52 is preferably designed as a substantially pot-shaped recess. Both the thread 48 and the second separating slit 40 open out into said first recess 52. The first recess 52 is defined at the top in the radial direction on the one hand by a contact surface 54 and at the bottom by a delimiting surface 56 which is designated in the present case as lower delimiting surface 56 (see FIG. 4). The contact surface 54 is arranged on the upper part 34 of the holder 12. The lower delimiting surface 56, in contrast, is arranged on the lower part 36 of the holder 12. The contact surface 54 and delimiting surface 56 are separated from one another by the second separating slit. The contact surface 54 serves for contacting the conical circumferential surface 58 which is provided on the screw head 46 of the screw 44 (see FIG. 9). FIG. 10 shows the cross section indicated in FIG. 5, in which cross section the first recess 52 can also be seen. The contact surface 54, which is arranged on the upper part 34 of the holder 12, is preferably angled at an angle $\alpha 1$ to the thread axis 60 of the thread 48 (see FIG. 10). Said angle $\alpha 1$ is preferably the same size as a second angle $\alpha 2$ which the conically shaped circumferential surface 58 of the screw head 46 encloses with the screw axis 62 of the screw 44 (see FIG. 9). It would also be possible, in principle, for the second angle $\alpha 2$ to be greater than the first angle $\alpha 1$. It is particularly preferred, however, for the two angles $\alpha 1$ and $\alpha 2$ to be the same size.

As can be seen further from FIG. 10, the distance between the contact surface 54 and the thread axis 60 is smaller than the distance between the thread axis 60 and the lower delimiting surface 56. The last-mentioned distance between the thread axis 60 and the lower delimiting surface 56 is also greater than half the diameter of the screw head 46 of the screw 44. This ensures that the screw 44, when being screwed into the holder 12, only contacts the contact surface 54 which is arranged on the upper part 34 of the holder 12 or cooperates with the same, whereas the lower delimiting surface 56, which is provided on the lower part 36 of the holder 12, in this case runs freely.

Although it is preferred, as mentioned above, to screw the screw 44 into the holder 12 from the first longitudinal side 50 of said holder, it is also possible in the case of the exemplary embodiment of the tool 10 shown here, to screw the screw 44 into the holder 12 from the opposite second longitudinal side 64 of the said holder. In the case of the exemplary embodiment shown in the present case, a recess 66 for receiving the screw head 46 of the screw 44 is also provided namely on the second longitudinal side 64 of the holder 12 (see FIGS. 2, 5 and 10). Said recess 66 is formed equivalently to the first recess 52 and also comprises equivalently to the first recess 52 a contact surface 54' and a lower delimiting surface 56' (see FIGS. 5 and 10). The recess 66 is designated in the present case as second recess 66. It is consequently possible, depending of the installation situation and the spatial conditions, for the screw 44 to be both inserted into the first recess 52 from the first longitudinal side 50 and to be inserted into the second recess 66 from the second longitudinal side 64 and then to be screw-connected with the thread 48.

Figure 7:
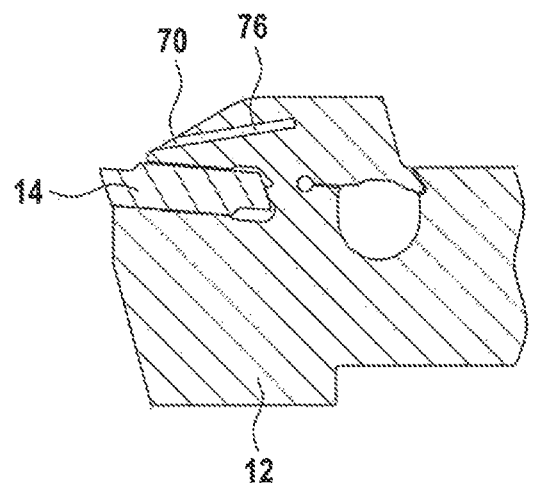
FIG. 7 shows a further longitudinal section of a detail of the tool.
Figure 8:
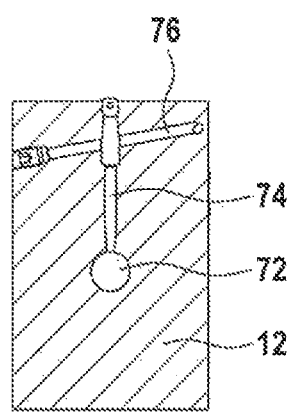
FIG. 8 shows a cross section through the holder of the tool.

The holder 12 further comprises an internal coolant channel 68. Coolant can be conducted via said coolant channel 68 through the holder 12 up to the region of the cutting insert 14. The coolant channel 68 comprises multiple sections which can be seen in FIGS. 6, 7 and 8. The coolant channel 68 opens out ultimately into a coolant outlet 70 which is arranged in the upper clamping jaw 24. The coolant can be introduced into the first section 72 provided in the shank 28 either at the side or from the rear end 26. From there, the coolant flows into the second section 74. Said second section 74 connects the first section 72 to a third section 76 which is arranged in the upper clamping jaw 24. The second section 74 extends through the interior of the web 42 from the lower part 36 into the upper part 34 of the holder.

Figure 6:
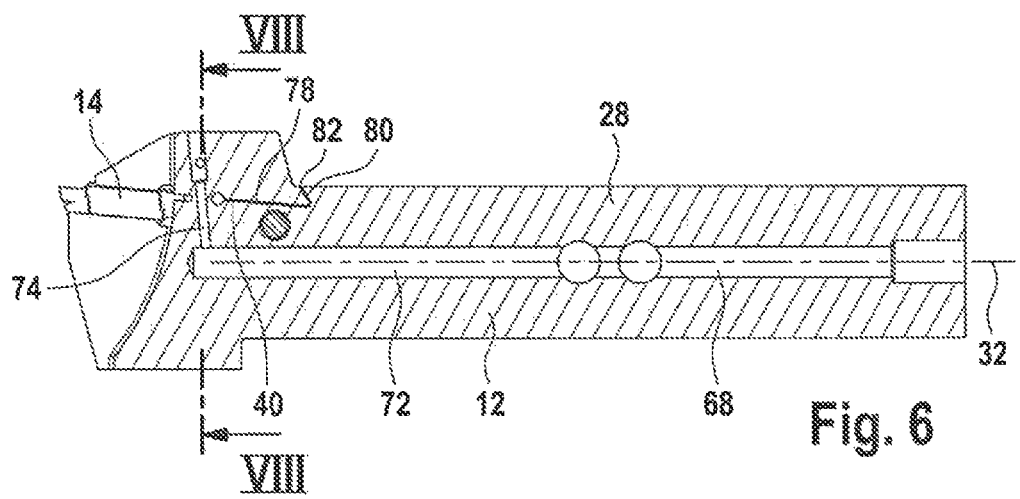
FIG. 6 shows a longitudinal section of the exemplary embodiment, shown in FIG. 1, of the tool.

It can further be seen in FIG. 6 that the second separating slit 40 is designed in a substantially V-shaped manner and comprises two portions, a first portion 78 and a second portion 80. The two portions 78, 80 of the second separating slit 40 together enclose an acute angle. The first portion 78 extends between the web 42 and the second portion 80. The second portion 80 extends between the first portion 78 and a free end 82 of the second separating slit 40. As a result of said V-shaped form of the second separating slit 40, the upper part 34 is prevented from being overtightened when the clamping screw 44 is tightened as the upper part 34 knocks against the shank 28 in the region of the second portion 80 if the first portion 78 is spread too far or the upper part 34 is tilted too strongly.

What is claimed is:

1. A holder for a tool for machining a workpiece, wherein the holder comprises at a front end a cutting insert receptacle for receiving a cutting insert and comprises at a rear end opposite the front end a shank which extends along a longitudinal axis and forms a clamping portion for clamping the holder in a machine tool, wherein the cutting insert receptacle comprises an upper and a lower clamping jaw, wherein the holder comprises an upper part on which the upper clamping jaw is arranged and comprises a lower part which is integrally connected to the shank and on which the lower clamping jaw is arranged, wherein the upper and the lower parts are connected together exclusively by means of a web which extends between a first and a second separating slit, wherein the two separating slits extend between the upper part and the lower part of the holder and are arranged on opposite sides of the web such that the upper part is pivotable relative to the lower part via the web in the manner of a rocker, wherein the first separating slit extends in a front holder region between the cutting insert receptacle and the web, and wherein the second separating slit extends in a central holder region between the web and the clamping portion, wherein the holder further comprises a screw which engages in a thread which is provided in the lower part and extends along a thread axis which is aligned perpendicularly to the longitudinal axis of the holder, wherein the screw comprises a conical screw head which cooperates with the upper part in the central holder region and is configured to spread the second separating slit in order to move the upper clamping jaw toward the lower clamping jaw and to clamp the cutting insert between the upper and the lower clamping jaws.

2. The holder as claimed in claim 1, wherein the holder comprises a first recess on a first longitudinal side for receiving the screw head, wherein the thread and the second separating slit open out into the first recess, wherein the first recess is delimited at least in part by a contact surface which is arranged on the upper part and with which the screw head cooperates.

3. The holder as claimed in claim 2, wherein the contact surface is shaped conically.

4. The holder as claimed in claim 3, wherein the contact surface encloses a first angle with the thread axis and wherein the conical screw head comprises a conical circumferential surface which encloses a second angle, which is greater than or equal to the first angle, with a longitudinal axis of the screw.

5. The holder as claimed in claim 2, wherein the first recess is delimited at least in part by a lower delimiting surface which is arranged on the lower part, wherein a first distance between the thread axis and the contact surface is smaller than a second distance between the thread axis and the lower delimiting surface, and wherein half a diameter of the screw head is smaller than the second distance.

6. The holder as claimed in claim 4, wherein the first recess is delimited at least in part by a lower delimiting surface which is arranged on the lower part, wherein a first distance between the thread axis and the contact surface is smaller than a second distance between the thread axis and the lower delimiting surface, and wherein half a diameter of the screw head is smaller than the second distance.

7. The holder as claimed in claim 2, wherein the upper clamping jaw and the lower clamping jaw adjoin a second longitudinal side of the holder, wherein the second longitudinal side is arranged opposite the first longitudinal side.

8. The holder as claimed in claim 6, wherein the upper clamping jaw and the lower clamping jaw adjoin a second longitudinal side of the holder, wherein the second longitudinal side is arranged opposite the first longitudinal side.

9. The holder as claimed in claim 7, wherein the holder comprises a second recess on the second longitudinal side for receiving the screw head, wherein the thread and the second separating slit open out into the second recess such that the screw is insertable into the thread as an option both from the first longitudinal side via the first recess and from the second longitudinal side via the second recess.

10. The holder as claimed in claim 8, wherein the holder comprises a second recess on the second longitudinal side for receiving the screw head, wherein the thread and the second separating slit open out into the second recess such that the screw is insertable into the thread as an option both from the first longitudinal side via the first recess and from the second longitudinal side via the second recess.

11. The holder as claimed in claim 1, wherein the second separating slit comprises a first portion which adjoins the web and a second portion which adjoins a free end of the second separating slit, wherein the first and the second portions are inclined relative to one another at an acute angle.

12. The holder as claimed in claim 1, wherein the first separating slit opens out into the cutting insert receptacle.

13. The holder as claimed in claim 1, wherein the first and the second separating slits cut through the holder over an entire width of the holder, and wherein the first separating slit is shorter than the second separating slit.

14. The holder as claimed in claim 1, wherein the holder comprises an internal coolant channel, wherein a coolant output of the coolant channel is arranged on the upper clamping jaw, and wherein a section of the coolant channel leads from the lower part into the upper part of the holder in an interior of the web.

15. A tool for machining a workpiece, having a cutting insert and a holder, wherein the holder comprises at a front end a cutting insert receptacle for receiving the cutting insert and comprises at a rear end opposite the front end a shank which extends along a longitudinal axis and forms a clamping portion for clamping the holder in a machine tool, wherein the cutting insert receptacle comprises an upper and a lower clamping jaw, wherein the holder comprises an upper part on which the upper clamping jaw is arranged and comprises a lower part which is integrally connected to the shank and on which the lower clamping jaw is arranged, wherein the upper and the lower parts are connected together exclusively by means of a web which extends between a first and a second separating slit, wherein the two separating slits extend between the upper part and the lower part of the holder and are arranged on opposite sides of the web such that the upper part is pivotable relative to the lower part via the web in the manner of a rocker, wherein the first separating slit extends in a front holder region between the cutting insert receptacle and the web, and wherein the second separating slit extends in a central holder region between the web and the clamping portion, wherein the holder further comprises a screw which engages in a thread which is provided in the lower part and extends along a thread axis which is aligned perpendicularly to the longitudinal axis of the holder, wherein the screw comprises a conical screw head which cooperates with the upper part in the central holder region and is configured to spread the second separating slit in order to move the upper clamping jaw toward the lower clamping jaw and to clamp the cutting insert between the upper and the lower clamping jaws.

* * * * *